Sept. 14, 1954  E. E. WEMP  2,689,030
ACTUATOR MECHANISM FOR POWER COUPLERS
Filed Jan. 4, 1951  7 Sheets-Sheet 2

INVENTOR.
Ernest E. Wemp
BY
Barnes, Kisselle, Laughlin & Raisch
Attorneys.

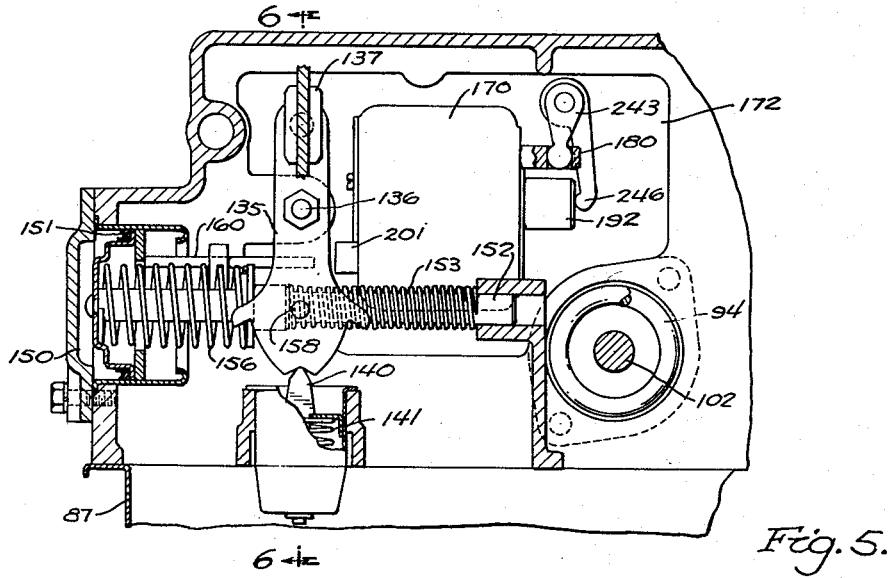

Sept. 14, 1954   E. E. WEMP   2,689,030
ACTUATOR MECHANISM FOR POWER COUPLERS
Filed Jan. 4, 1951   7 Sheets-Sheet 6

INVENTOR.
Ernest E. Wemp
BY
Barnes, Kisselle, Laughlin & Raisch
Attorneys.

Sept. 14, 1954          E. E. WEMP          2,689,030

ACTUATOR MECHANISM FOR POWER COUPLERS

Filed Jan. 4, 1951                          7 Sheets-Sheet 7

INVENTOR.
Ernest E. Wemp
BY
Barnes, Kisselle, Laughlin & Raisch
Attorneys.

Patented Sept. 14, 1954

2,689,030

UNITED STATES PATENT OFFICE 2,689,030

ACTUATOR MECHANISM FOR POWER COUPLERS

Ernest E. Wemp, Detroit, Mich., assignor of five per cent to Eleanor M. Wemp, Los Angeles, Calif., five per cent to Leah K. Smith, five per cent to Clyde J. Smith, and twenty per cent to Lila A. Wemp, all of Detroit, Mich.; William O'Neill Kronner and Lila A. Wemp, executors of said Ernest E. Wemp, deceased Application January 4, 1951, Serial No. 204,330

4 Claims. (Cl. 192—85)

1

This invention relates to improvements in automatic transmissions for automotive vehicles and especially transmissions for passenger vehicles.

The general objects of the invention are to provide an improved automatic transmission with a positive and sure action and embodying a relatively simplified construction so that it can be manufactured at a relatively low cost and thus used on automotive vehicles without materially increasing the cost thereof. Moreover, the invention aims to provide a transmission of such a construction as to require a minimum of service in the field and a transmission which, if it needs service, is not so complicated or specialized but what most well equipped service garages can service the same. In this connection, it may be stated that some automatic transmissions are quite complicated resulting in service difficulties.

The invention further aims to provide a transmission of the type having a low speed range and a high speed range and which embodies a hydraulic torque converter for transmitting torque in the low speed range and a clutch for transmitting the torque in the high speed range. In conjunction with this, is gearing and a power coupler. The power coupler is automatically actuated in accordance with speed and torque conditions for causing the condition of the transmission to change to and from the low speed range and the high speed range. In the low speed range the torque is transmitted through the hydraulic torque converter and through the gearing, as effected by the dental coupling of the power coupler. In the high speed range, torque is transmitted by the clutch and the hydraulic torque converter and gearing transmit no torque due to the release of dental engagement by the power coupler. The power coupler is one which is arranged to engage and disengage a dental coupling while the parts, which are brought into and out of dental engagement, are under torque load; that is to say, they are both being positively driven by the engine and/or the moving vehicle.

These and other objects will be better appreciated as the following detailed description is considered in conjunction with the accompanying drawings which show a transmission construction in accordance with the invention.

2

Figure 1:
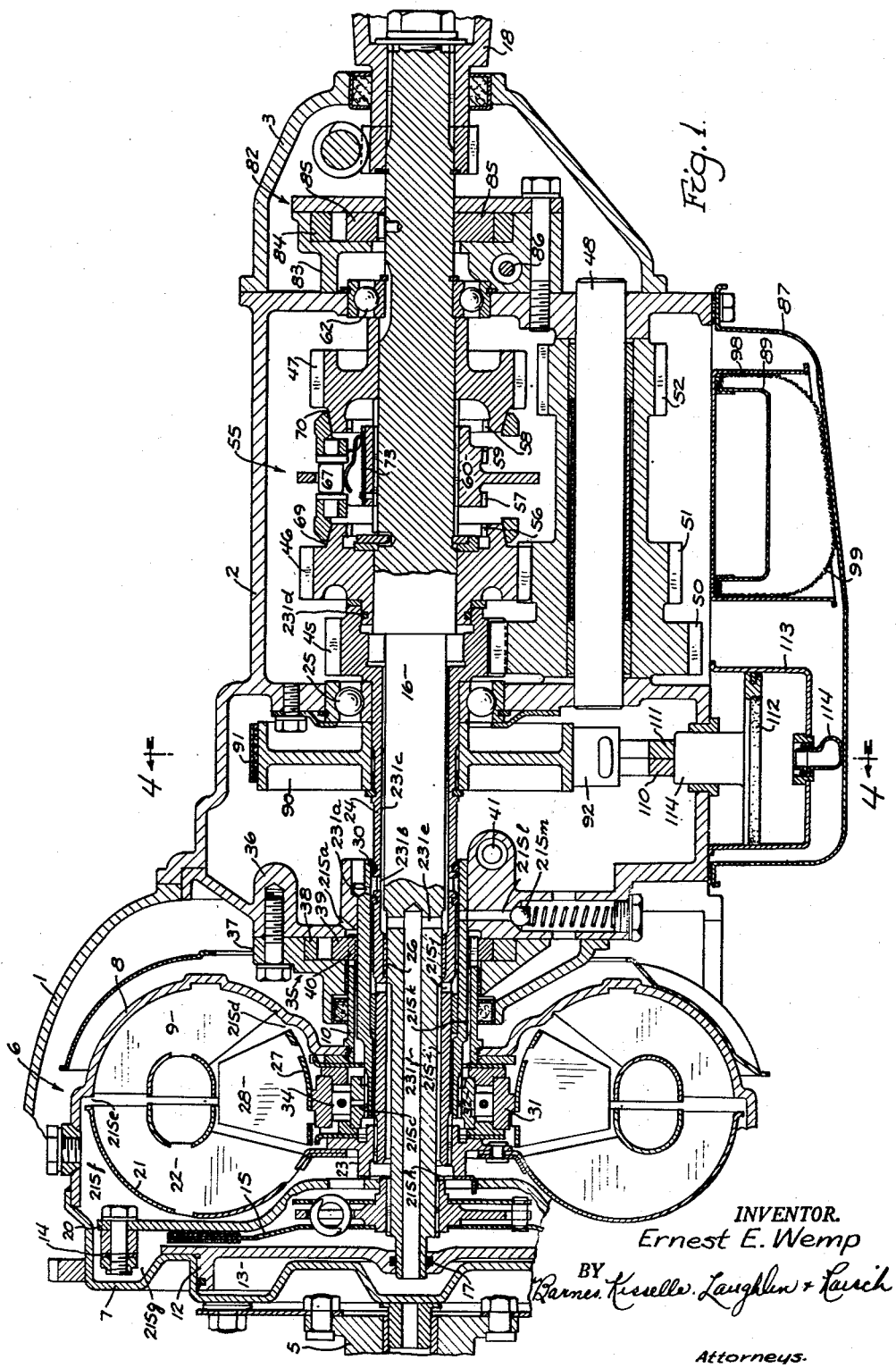
Fig. 1 is a general cross sectional view illustrating the torque converter, the transmission gearing and the clutch.
Figure 2:
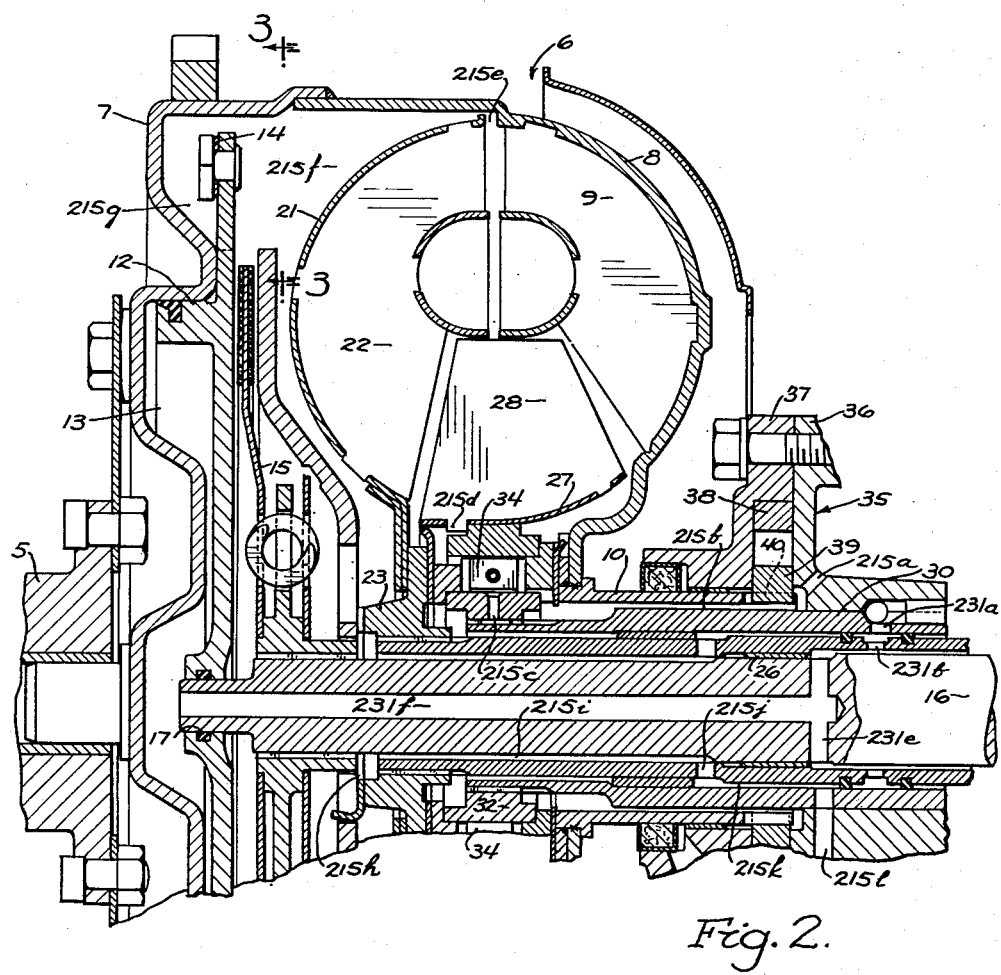
Fig. 2 is an enlarged view in cross section showing the torque converter and clutch.
Figure 4:
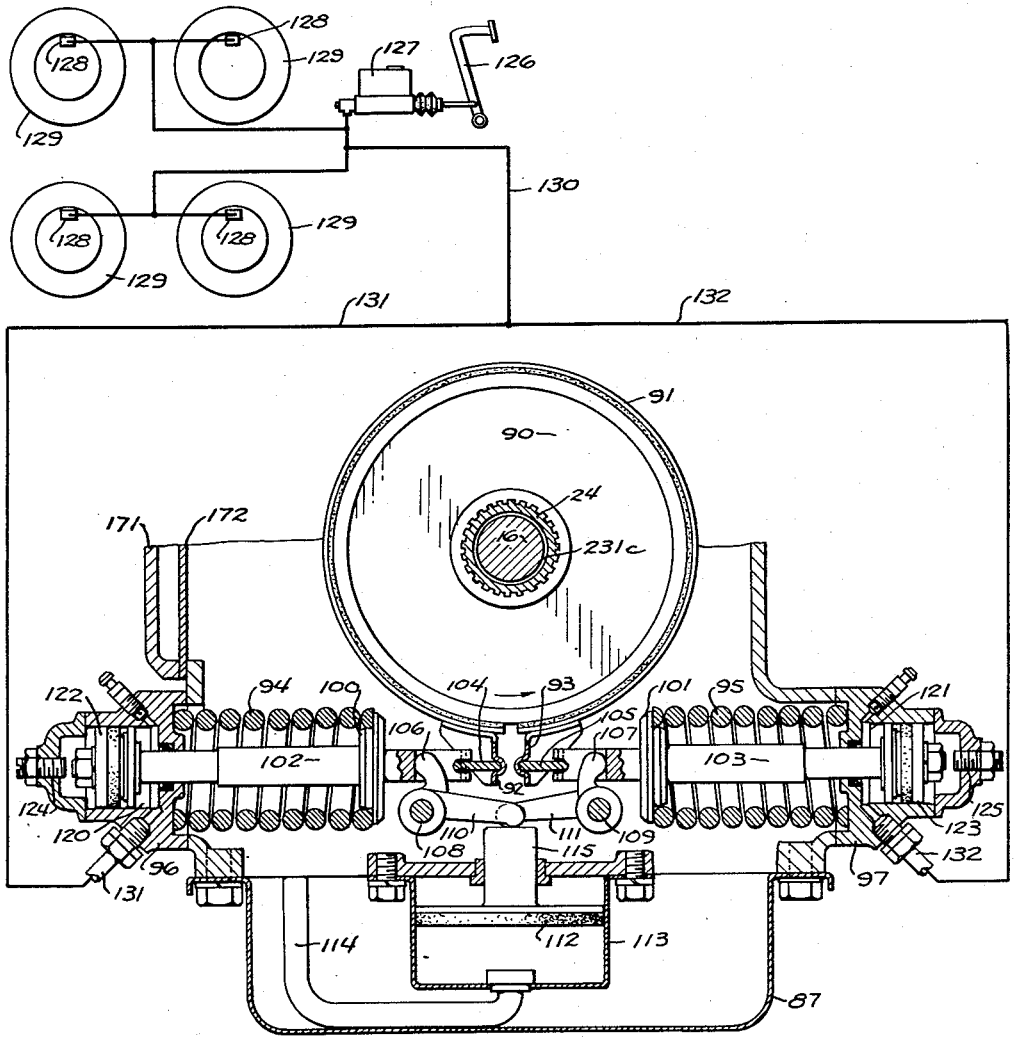

Fig. 4 is an enlarged cross sectional view taken substantially on line 4—4 of Fig. 1 showing the anti-creep brake.

Fig. 5 is a view with parts cut away and parts in section showing some of the operating mechanism within the range change section of the transmission.

Fig. 6 is a sectional view taken through the range change section substantially on line 6—6 of Fig. 5 showing some of the gearing, the coupler actuator, and the control valve block.

Figure 7:
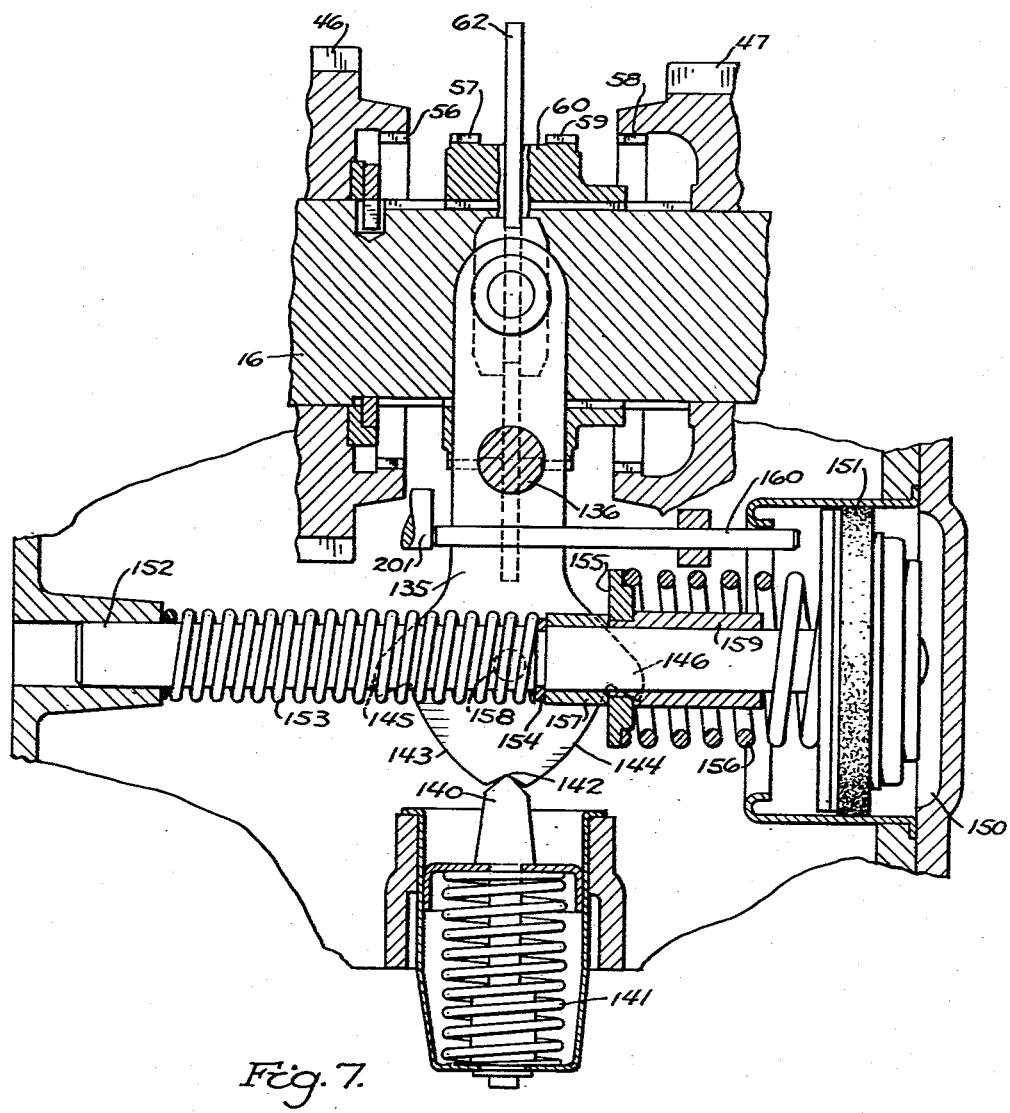

Fig. 7 is a detailed view with some parts in cross section showing the actuating mechanism for the power coupler.

Figure 8:
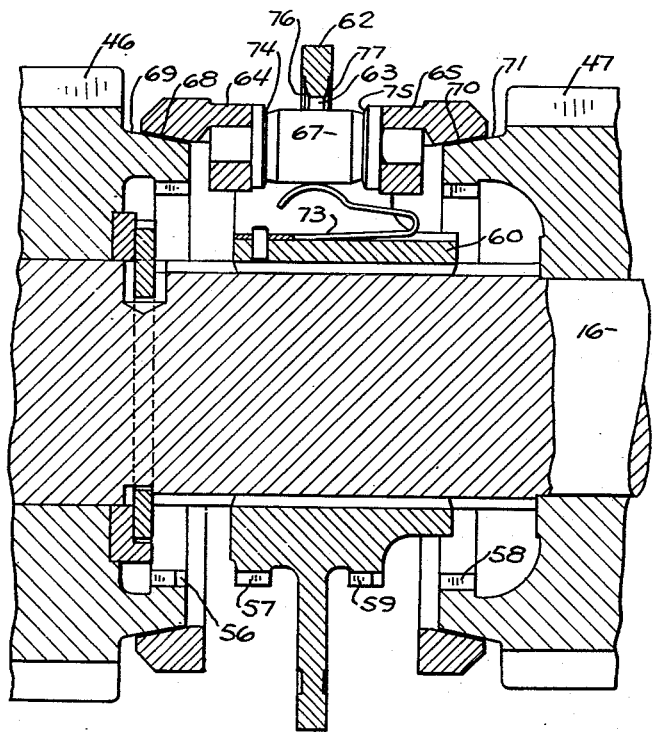

Fig. 8 is a view illustrating the power coupler and the gear members associated therewith.

Figure 9:
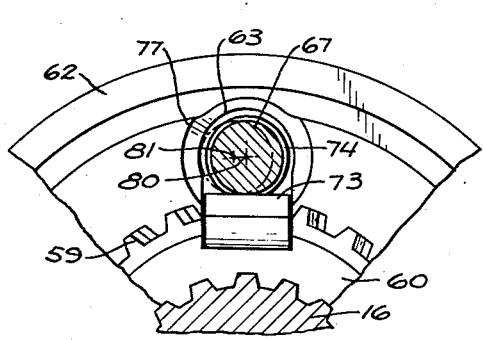

Fig. 9 is a view taken on line 9—9 of Fig. 8 illustrating blocker structure for the coupler.

Figure 10:
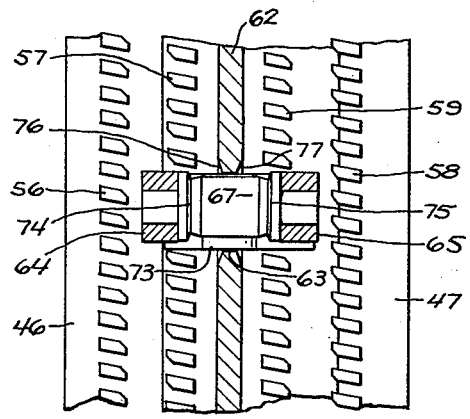

Fig. 10 is a view showing a development of the teeth on the coupler.

Figure 10A:
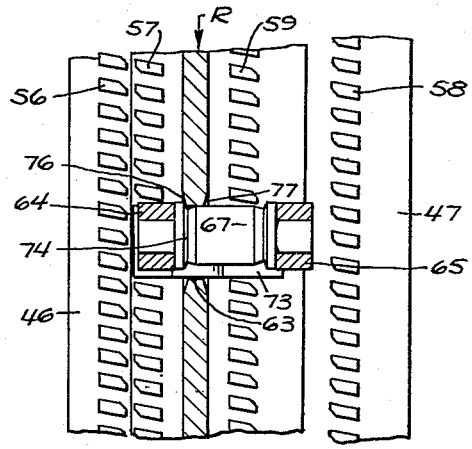

Fig. 10a is a view similar to Fig. 10 showing the parts in blocked position.

Figure 10B:
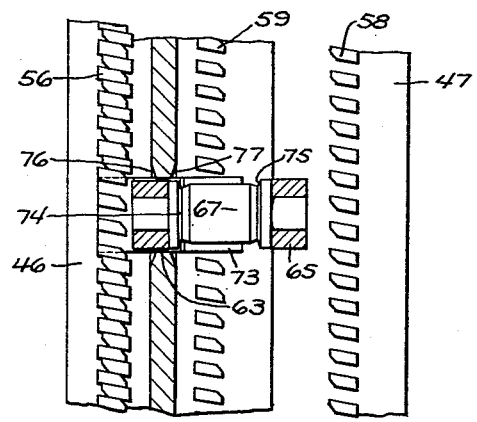

Fig. 10b is a view similar to Fig. 10 showing the parts in engaged position.

The transmission as shown in Fig. 1 has a housing section 1 for a torque converter, an intermediate housing 2 for gearing of the range change section, and an end housing member 3. The crank shaft of an engine is shown at 5. It is drivingly connected with the impeller or driving member of a hydraulic torque converter, generally shown at 6, having a forward plate 7 and a rear wall 8 provided with vanes 9. The rear wall 8 constitutes a part of the torus chamber and the rear wall has a projecting hub portion 10.

Figure 3:
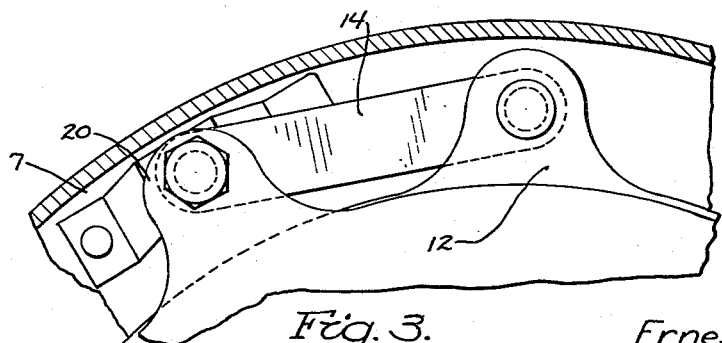
Fig. 3 is a detailed view illustrating the flexible drive for the pressure plate of the clutch.

The front plate 7 is formed to provide a cylinder for receiving the piston portion of a clutch pressure plate 12, the defined cylinder space being shown at 13. The pressure plate is drivingly connected to the engine as by means of flexible straps 14 (Fig. 3) so that the pressure plate may shift axially for the purpose of engagement and disengagement of a clutch. A clutch driven disc 15 has its hub drivingly connected to a clutch shaft 16. This clutch shaft has its forward end piloted as at 17 in the pressure plate 12 and it extends through the transmission and has a final drive member 18 at its rear end which may be one of the members of a universal joint coupling. A drive shaft, not shown, extends from the coupling 18 to the driving wheels of a vehicle. Connected to the plate 7, and disposed on the opposite side of the clutch driven disc is a clutch driving member 20.

The turbine or driven member of the hydraulic torque converter has a wall 21 with vanes or blades 22 and this member has its hub 23 drivingly mounted on a sleeve 24. This sleeve projects into the transmission housing 2 and is journalled in a bearing 25, there being also a bearing 26 between the sleeve and the clutch shaft. The stator of the torque converter has a wall 27 with vanes or blades 28. The stator is mounted on a fixed sleeve 30 through the means of a one-way drive coupling which embodies an outer member 31 on the stator, and an inner member 32 splined on the hub 30 and one way drive means between the inner and the outer members as shown at 34. This one way drive means or overrunning clutch arrangement may be of the sprag type. It permits the stator to rotate in one direction only (forward) but it cannot operate in the opposite direction (backward) as the sleeve 30 is fixed from the standpoint that it is not rotatable.

There is a partition between the housing sections 1 and 2 constituted by a plate 36 and a plate 37 which cooperate to provide a pump chamber. The pump is generally shown at 35. Within this chamber is a rotary type of pump having an outer member 38 and an inner member 39 and the inner member is keyed or splined to the sleeve 10 as shown at 40. Thus it will be seen that this pump, conveniently called the front pump is driven directly by the engine. This pump has a suitable pressure relief valve as shown at 41.

This type of torque converter is known to those skilled in the art. As the engine operates hydraulic medium, which may hereafter be termed oil, is pumped into the torus chamber by the pump and circulated therethrough and the impeller 8 drives the turbine 21 and torque is transmitted by the sleeve 24. At low speeds and at high torque the stator tends to rotate reversely which it cannot do because it is held by the one way drive coupling and the sleeve 30. The stator vanes so change the velocity angle of the oil that there is a torque conversion in that the engine operates at a higher R. P. M. than the sleeve 24 and a higher torque is transmitted to the sleeve 30 since torque or speed are reciprocal. However, as the speed increases and the speed of rotation of the turbine approaches that of the impeller the reaction on the stator blades diminishes and finally the stator merely idles and rotates in the direction of rotation of the impeller and turbine and performs no further function in changing the direction of the velocity flow of the oil. When this condition exists the impeller and turbine act essentially as a fluid coupling and are rotating without torque conversion and substantially at the same speed of rotation less that which is unavoidably present in a hydraulic coupling of this type.

In the range change section of the transmission is a gear 45 which may be integral with the sleeve 24. A gear 46 is journalled on the clutch shaft 16 and a gear 47 also journalled on the shaft 16. There is a countershaft 48 with a gear cluster journalled thereon including a gear 50 the teeth of which mesh with those of gear 45, a gear 51, the teeth of which mesh with those of gear 46 and a reverse gear 52. The teeth of the reverse gear 52 (Fig. 6) mesh with the teeth of an idler gear 53 and the teeth of the idler gear mesh with those of gear 47.

The gears 46 and 47 are spaced apart and between them lies a power coupler generally illustrated at 55. The gear 46 is provided with a set of internal teeth 56 for dental engagement with teeth 57 on the coupler. The gear 47 is provided with a set of internal teeth 58 for dental engagement with a set of teeth 59 on the coupler. The body or hub of the coupler 60 is slidably splined to the clutch shaft as indicated. As aforesaid, the clutch shaft extends out through the rear of the transmission and it is carried by a suitable bearing 62.

Before proceeding with further description the general operation may be referred to. In the low range, the coupler 55 is shifted to the left and coupled with the gear 46. Accordingly, with the clutch disengaged the torque converter functions to transmit torque to the turbine thence to the sleeve 24 and gear 45. This torque is transmitted through the gears 50 and 51 to the gear 46, thence to the coupler and to the clutch shaft. The torque converter may function to transmit torque starting from a very low speed ratio between the engine and the shaft 16 and a higher torque ratio and when conditions are such that the stator ceases to function as such and begins to idle; the torque is then transmitted through the fixed reduction provided by the gear train. At this time the gear train determines the relative speed and torque ratio except for the unavoidable slip in the hydraulic converter which is functioning at the time as a fluid coupling. Following this the clutch comprising parts 12, 15 and 20 is to be engaged and after engagement the torque is then transmitted directly to the shaft 16 and at this time the coupler 55 is disengaged from the gear 46. Also at this time, the turbine 21, the sleeve 24, the gears 45 and 46, and the gear cluster, merely rotate in an idling fashion in the sense that no torque is transmitted therethrough except that necessary to overcome what little friction is present. When the coupler 55 is shifted to the right as Fig. 1 is viewed, to engage the teeth 58 and 59, the shaft 16 is driven in the reverse direction for the purpose of backing up the vehicle. In this case the torque is transmitted through the converter and the clutch is disengaged.

The power coupler is of the type shown in Pat. No. Re. 22,761 of May 28, 1946, and in Pat. No. 2,441,174 of May 11, 1948, and probably needs only a general disclosure herein. The coupler member 60, which is splined to the shaft 16, has a flange 62 with apertures 63 therein. The coupler is shifted by shifting means applied to the flange as will presently be seen. Two ring members 64 and 65 are arranged to receive pins 67 which pass through the apertures with clearance. Conveniently there are three apertures in the flange and three pins. The ring member 64 has a conical face 68 for frictionally engaging a conical face 69 on an extension of the gear 46, while the ring 65 has a conical face 70 for engaging the conical face 71 of an extension on the gear 47. There are springs 73 fastened to the coupler and arranged to engage each pin to maintain a frictional relationship. Each pin has a shoulder 74 and a shoulder 75 arranged to be abutted respectively by a surface or a shoulder 76 and a surface or a shoulder 77 bounding the apertures 63 in the flange.

When the parts are in operation the coupler is shifted to cause a dental engagement of the teeth 56 and 57, when the shaft 16 and, therefore the coupler, are rotating faster than the gear 46. When the coupler is shifted to the left for the above purpose, the blocker assembly, i. e. the rings 64 and 65 and pins 67, is shifted to the left by the action of the springs 73 and the faces 68 and 69 frictionally engage each other. The relative motion reaction due to the slower running gear 46 rocks the blocker assembly relative to the coupler and the shoulders 76 abut the shoulders 74 and thus blocks movement of the coupler. This position is shown in Fig. 10a. The relative motion reaction as indicated by the arrow R urges the blocker assembly to the right as Fig. 10a is viewed relative to the coupler 60 and therefore shoulders 76 engage shoulders 74 and further movement of the coupler and its flange 62 toward the gear 46 is arrested. Thus the teeth 56 and 57 are held from engaging each other. However, when the gear 46 and the shaft 16 approach synchronization and particularly when the gear 46 tends to overrun the shaft 16 the relative motion reaction reverses and the blocker assembly is shifted rotatably relative to the coupler to move the shoulders 74 out of blocking position relative to shoulders 76 and then the coupler may continue its movement to the left to dentally engage the teeth 56 and 57 as shown in Fig. 10b. The same general action occurs in dentally engaging the teeth 58 and 59 for establishing reverse drive.

The teeth 56 and 57 are helically disposed as shown in Fig. 10 so that normally when torque is transmitted therethrough from the engine to the shaft 16, the angle of the teeth tend to hold the teeth in engagement with each other. On reversal of torque, however, that is, when torque is delivered from the shaft 16 and into the gear train, the inclined or helical teeth tend to reject the coupler or, in other words, tends to shift the teeth out of dental engagement. This tendency will not cause disengagement, however, in normal operation. In Fig. 9 a pin 67 is shown centered in the aperture 63 and the dotted line position thereof illustrates a blocking position, the pin having moved from a center as illustrated at 80 to a center 81. Also, it will be seen how the helical teeth 59 on the coupler are removed at locations in order to accommodate the springs 73. Thus, the teeth 57 and 59 are disposed in segmental groups but there are, of course, a sufficient number of teeth to form an adequate dental connection with the teeth on the gears.

There is another pump 82 for hydraulic medium which is driven by the shaft 16. This pump is shown as being located in the housing section 3 and it has a housing 83 with a pump member 84 and a pump member 85 which is drivingly connected with the shaft 16. The pump has a suitable pressure relief valve shown at 86. This may be termed the rear pump.

The transmission case is provided with a bottom closure or pan 87 which constitutes a sump for the oil and the two pumps have a common inlet conduit or passageway 88 (Fig. 6) communicating into the sump. There is a screen 89 in the sump into which the inlet communicates. The screen is covered by a downwardly opening shell 98 to prevent oil surge. The lower end of the shell is spaced from the bottom of the pan so that oil may freely enter. The screen is held in place by a spring 99 which seats on the bottom of the pan 87.

There is an anti-creep brake applicable to a torque transmitting member for restraining the vehicle against creeping action when the engine is idling. This takes the form of a brake member or disc 90 splined or otherwise attached to the sleeve 24 and a brake band 91. The structure is shown in Fig. 4. Each end of the brake band is provided with an end piece or ear 92 and 93 and there are two oppositely acting springs 94 and 95 backed up by spring seats 96 and 97 which tend normally to wrap the brake band on the disc. Heads 100 and 101 mounted on rods 102 and 103 transmit the thrust of the springs through struts 104 and 105 which engage the end pieces or ears 92 and 93. The rods 102 and 103 are bifurcated, each for receiving one end 106 and 107 of bell cranks pivoted as at 108 and 109 and each having an arm 110 and 111. A piston 112 in a cylinder 113, to which oil under pressure may be pumped through conduit 114, has a projecting part 115 for engaging the arms 110 and 111 as indicated. If oil under pressure is introduced into the cylinder the piston moves upwardly as Fig. 4 is viewed, the bell cranks are swung on their pivots and the springs are compressed and the load thereby relieved from the brake band to release the brake. If the cylinder is vented or opened to an exhaust the springs expand and the brake is applied. Each spring seat has a cylinder formed therein as shown at 120 and 121 and each rod has a piston mounted thereon and positioned in these cylinders as shown at 122 and 123. The springs can only be compressed to the point where the rods abut adjustable stops 124 and 125.

This anti-creep brake arrangement is connected into the hydraulic service brake system of the vehicle. Diagrammatically illustrated in Fig. 4 is a brake pedal 126 of the vehicle which operates a piston in the master cylinder 127 of the hydraulic system and conduits illustrated convey the medium to actuating units 128 for each of the four wheels 129 of the vehicle. Leading from the master cylinder of the brake system is the conduit 130 which has branches 131 and 132 and which respectively connect into the cylinders 120 and 121. Therefore, when the brakes of the vehicle are applied, braking fluid is introduced into the cylinders and the pistons 122 and 123 shifted so as to compress the springs 94 and 95 to release the brake. The detailed manner of this operation and the functions thereof will be later considered.

The power coupler is controlled both manually and automatically and the means for controlling it is shown in Figs. 5, 6 and 7 as well as in other figures. There is a lever 135 mounted on a control shaft 136 which has an operator or shoe 137 for engaging the flange of the coupler. On the outside of the transmission case the shaft 136 is provided with an operating lever 138 to be connected by means not shown to suitable operating means convenient to the operator. The operator may shift the lever 138 to one of three positions. One position being forward, one being neutral and the other reverse. The neutral position is shown in Fig. 7 where the coupler 60 is out of dental engagement with both gears 46 and 47. At this time a detent 140 pressed by a spring 141 engages in a notch 142. On each side of this notch the lever has a cam surface as indicated at 143 and 144 with an abutment or limit stop at each end thereof as at 145 and 146. To shift the coupler manually into engagement with the gear 47 for reverse operation the lever 135 is rocked clockwise as Fig. 7 is viewed and the coupler is shifted to the right. The detent is forced out of the notch 142 and when the coupler engages the gear 47 the limit stop 146 engages the detent 140. The cam 144 is so shaped that when the detent is pressed against it there is a tendency to rock the lever 135 clockwise thus urging the coupler toward dental engagement with the gear 47. Disengagement of the coupler from the gear 47 may be effected by the reverse action shifting the lever 135 back to the position shown in Fig. 7.

The lever 135 is acted upon automatically by a power coupler servo in the form of a cylinder 150 with a piston 151 therein mounted on a rod 152. A coil spring 153 normally holds the piston retracted in its cylinder. This spring acts on a ring 154 fixedly mounted on the piston rod 152 and there is a spacer sleeve 157. A washer 155 is mounted on a sleeve 159 which is slidable on the rod and a spring 156 is positioned between the washer and the piston. The lever 135 has a pin 158 arranged to be engaged by the washer 155 at appropriate times as will presently appear in considering the operation of the mechanism. Associated with the piston is a valve actuating rod 160. This rod is capable of reciprocation and is engaged by the piston in the latter stages of its movement caused by oil introduced in the cylinder 150 to operate a controlling valve.

The automatic control is primarily by hydraulic means, not shown, except generally in Fig. 5, wherein a valve block 170 has an actuator 201 to be engaged and actuated by rod 160. Other valve members are shown at 180 and 192 controlled by levers 243 and 246.

When the lever 135 is in the position shown in Fig. 7, the coupler is in neutral and held there because the plunger 140 seats in the notch 142. For forward operation, the operator manually shifts the lever counter-clockwise so that the plunger acts on face 143 placing a load on the lever tending to shift the coupler in engagement with the teeth 56. As explained above, a dental coupling will occur when the relative motion reaction of the coupler permits. As the speed of the vehicle increases to a certain value, oil under pressure is passed by means not shown into the cylinder 150 and the piston 151 is shifted to the left as Fig. 7 is viewed. The piston shifts rod 160 and the valve member 201 and the actuation of valve 201 introduces hydraulic medium into the clutch cylinder 13. Thus, the clutch starts to engage and begins to transmit torque directly to the shaft 16. At the same time, the spring 156 has been loaded and it applies pressure to the lever 135 through pin 158 tending to withdraw the coupler from engagement with the teeth 56. As the clutch continues engagement and more and more torque is delivered to the shaft 16, the load on the teeth 56 and 57 is reduced to a point so near zero load that the energized spring rocks the lever 135 clockwise and withdraws the coupler from engagement with the teeth 56. When this dental coupling is disestablished the clutch continues engaging and when fully engaged there is a direct drive through the clutch, through the shaft 16, and through the final drive member 18. However, the lever 135 is not moved far enough clockwise to cause the notch 142 to be engaged by the plunger 140.

If, for example, the vehicle drops in speed, oil under pressure is cut off from the cylinder 150 and the piston is moved back to the Fig. 7 position by the spring 153. The rod 160 and valve member 201 are thus relieved by the piston and the hydraulic medium is cut off from the clutch cylinder 13. The clutch starts to disengage and the spring 141 and plunger 140 tends to swing the lever 135 counterclockwise to shift the coupler toward engagement of its teeth 57 with the teeth 56 on gear 46. The relative motion reaction is such that the shoulder 76 engages the shoulder 74 as demonstrated in Fig. 10a and the coupler is blocked from further movement toward the gear 46 and the teeth 57 do not come into engagement with teeth 56. However, as the engine continues acceleration with resultant acceleration of gear 46 the gear finally comes up to the speed of the coupler and the shaft and ultimately the blocking action is released. At this moment the teeth 56 and 57 are at substantially the same speed and the coupler can move to the left as Fig. 7 is viewed and dental engagement is established. If the operator shifts the lever 135 clockwise from the Fig. 7 position, the plunger engages face 144 and shifts the coupler to the right to engage teeth 58 and 59 for reverse drive.

I claim:

1. In an automatic transmission for an automotive vehicle, a torque transmitting shaft, a torque transmitting member concentric with and rotatable relative to the shaft, a coupler slidably and drivably mounted on the shaft, the coupler and the member each having teeth for dental engagement and disengagement, a lever, a pivot for the lever, means connecting the lever to the coupler, the lever having a curved cam-like surface, a recess in said surface, a shoulder at one end of the surface and spaced from the recess, a spring pressed plunger operating on said surface between the recess and shoulder and placing a force on the lever for moving it in a direction to urge the coupler toward dental engagement with said member, said shoulder engaging the plunger when the coupler and member are in dental engagement, automatically acting reciprocating fluid motor means operable in one stroke for shifting the lever in the opposite direction to retract the coupler from dental engagement with said member, the maximum movement provided by the fluid motor means being such that the recess is not moved into engagement with the plunger whereby the coupler moves back into dental engagement with the said member upon operation of the fluid motor means in its opposite stroke, and operator controlled means for moving the lever through an increment of movement greater than that imparted to it by said automatic means for engagement of the plunger with the recess to hold the coupler out of dental engagement with said member.

2. In an automatic transmission for an automotive vehicle, a torque transmitting shaft, a torque transmitting member concentric with and rotatable relative to the shaft, a second torque transmitting member concentric with and rotatable relative to the shaft, a couple slidably and drivingly connected to the shaft and positioned between said two members, the coupler and each member having teeth for dental engagement, a lever, a pivot for the lever, means connecting the lever to the coupler, said lever having a curved cam like surface with a recess in its intermediate portion, a spring pressed plunger engaging said surface, said plunger placing a force on the lever for shifting the coupler into dental engagement with one of said members, automatically acting reciprocating fluid motor means operable in one stroke for shifting the lever in the opposite direction to retract the coupler from engagement with said one member through a limited movement so that the said recess does not come into engagement with the plunger whereby the coupler moves back into dental engagement with the said member upon operation of the fluid motor means in its opposite stroke, manually controlled means for shifting the lever an additional increment in said opposite direction to bring the recess into alignment with the plunger so that the interengagement between the recess and plunger holds the coupler in a neutral position disengaged from both said members, said manual means being operative to shift the lever so that the plunger engages the said surface on the opposite side of the recess whereby the plunger places a force on the lever to shift the coupler toward dental engagement with the other of said members.

3. In an automatic transmission for an automotive vehicle, a torque transmitting shaft, a torque transmitting member concentric with and rotatable relative to the shaft, a second torque transmitting member concentric with and rotatable relative to the shaft, a couple slidably and drivingly connected to the shaft and positioned between said two members, the coupler and each member having teeth for dental engagement, a lever, a pivot for the lever, means connecting the lever to the coupler, said lever having a curved cam like surface with a recess in its intermediate portion, a spring pressed plunger engaging said surface, said plunger placing a force on the lever for shifting the coupler into dental engagement with one of said members, automatically acting reciprocating fluid motor means operable in one stroke for shifting the lever in the opposite direction to retract the coupler from engagement with said one member through a limited movement so that the said recess does not come into engagement with the plunger whereby the coupler moves back into dental engagement with the said member upon operation of the fluid motor means in its opposite stroke, manually controlled means for shifting the lever an additional increment in said opposite direction to bring the recess into alignment with the plunger so that the interengagement between the recess and plunger holds the coupler in a neutral position disengaged from both said members, said manual means being operative to shift the lever so that the plunger engages the said surface on the opposite side of the recess whereby the plunger places a force on the lever to shift the coupler toward dental engagement with the other of said members, and an abutment at each end of said surface on the lever for engaging the plunger when the coupler is in dental engagement with the respective members.

4. In an automatic transmission for an automotive vehicle, a torque transmitting shaft, a torque transmitting member concentric with the shaft, a coupler slidably and drivably mounted on the shaft, the coupler and member each having teeth for dental engagement and disengagement, a lever, a pivot for the lever, means connecting the lever to the coupler, said lever having a cam face and a dentent portion, a spring pressed plunger engageable with the detent portion to hold the lever fixed in position with the coupler disengaged from the member, manually operable means to shift the lever to cause the plunger to act on the cam face whereby to tend to turn the lever and shift the coupler towards dental engagement with said member, a cylinder for receiving hydraulic medium, a piston in the cylinder having a rod projecting therefrom, a sleeve slidable on the rod, a spring between the piston and the sleeve, and means on the sleeve for engaging the lever to swing the lever in a direction for withdrawing the coupler from dental engagement with said member, the effective stroke of the piston being less than that required to shift the lever to a position of engagement of the detent means and the plunger.

References Cited in the file of this patent

UNITED STATES PATENTS

| Number | Name | Date |
|---|---|---|
| 1,775,873 | Smith | Sept. 16, 1930 |
| 1,819,306 | Starkey et al. | Aug. 18, 1931 |
| 1,866,662 | Matthews | July 12, 1932 |
| 2,001,292 | Maier et al. | May 14, 1935 |
| 2,006,913 | Conley | July 2, 1935 |
| 2,019,073 | Cooper | Oct. 29, 1935 |
| 2,118,188 | Gallup | May 24, 1938 |
| 2,126,849 | Weiss | Aug. 16, 1938 |
| 2,204,710 | Strout | June 18, 1940 |
| 2,228,612 | Sanford | Jan. 14, 1941 |
| 2,338,546 | Scholl | Jan. 4, 1944 |
| 2,356,598 | Lang et al. | Aug. 22, 1944 |
| 2,360,646 | Carnagua | Oct. 17, 1944 |
| 2,368,517 | Brimble | Jan. 30, 1945 |
| 2,371,574 | Swennes | Mar. 13, 1945 |
| 2,433,052 | Kelley | Dec. 23, 1947 |
| 2,466,206 | Carnagua | Apr. 5, 1949 |
| 2,475,679 | Sinclair | July 12, 1949 |